2,683,185

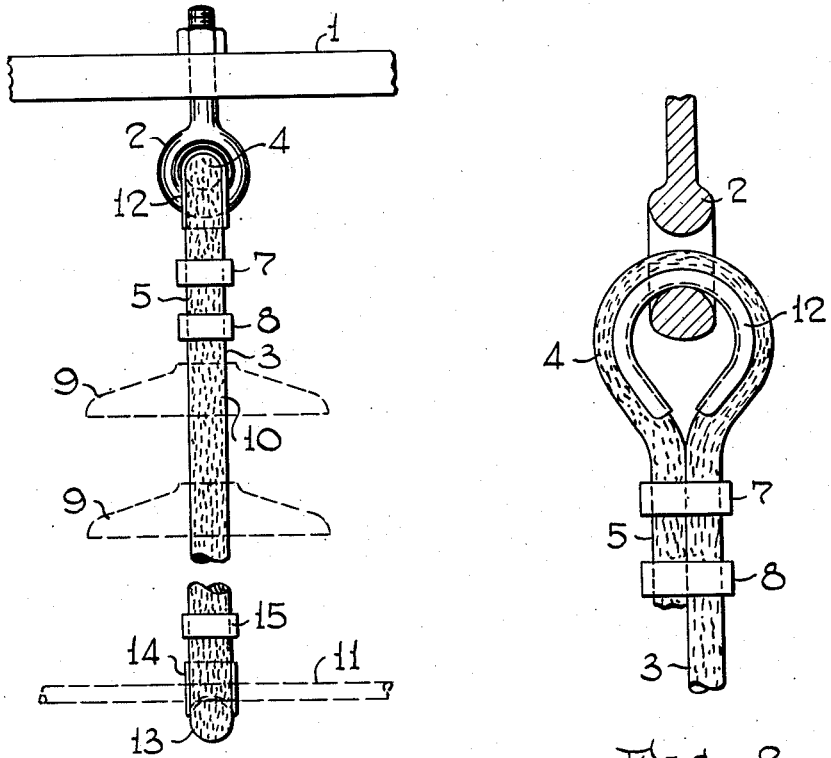
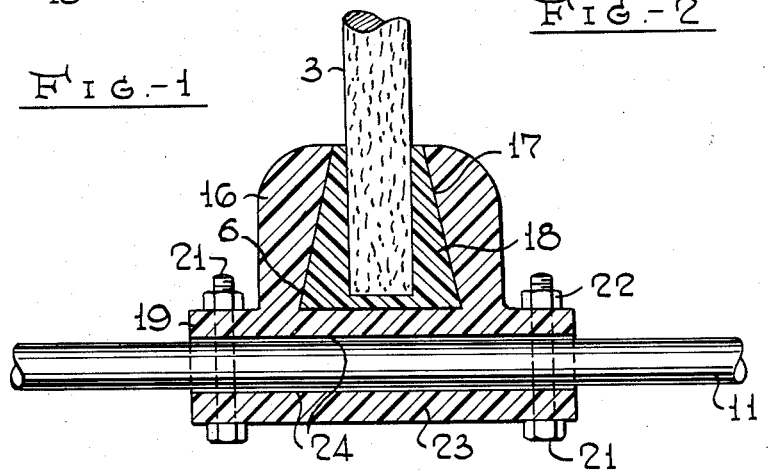
Fig.-1
Fig.-2
Fig.-3
Jay W. Morrison  Inventor
By Peter J. Gaylor  Attorney Patented July 6, 1954

UNITED STATES PATENT OFFICE 2,683,185

FLEXIBLE SUSPENSION FOR HIGH-TENSION CABLES

Jay W. Morrison, Newark, N. J.

Application May 27, 1950, Serial No. 164,767

1 Claim. (Cl. 174—139)

This invention relates to the suspension of high tension cables by means of glass fiber rope which also serves as a flexible insulation means for said cables.

Conventional suspension means now used fall in the classes of rigid or semi-rigid hangers consisting of a series of superimposed flared ceramic insulators to which are hung the high tension cables. Such suspension means have many disadvantages among which are the cracking of the ceramic due to excessive sway of the cable, crushing of the brittle ceramic by excessive tension or compressive forces, to which the ceramic is exceptionally sensitive, and various other faults which are absent in the suspension of the present invention. In addition to the lack of these disadvantages, the suspension means herein disclosed possess many other desirable features such as low cost, ease in installation, etc.

The invention will be more readily understood by reference to the accompanying drawings in which Figure 1 represents a partially cut away side view of a preferred embodiment. A view of the upper hanger portion shown at right angles to the view illustrated in Figure 1 is depicted in Figure 2, while Figure 3 illustrates a bottom cross-sectional view of another alternative means for suspending the cable. Similar numerals refer to similar parts in the various figures.

Referring again to the drawing, numeral 1 represents a cross-arm, usually extending from the top of a tower or pole from which is vertically disposed eye bolt 2 on which flexible glass fiber rope 3 is mounted. Rope 3 is a stout cord of fine glass filaments, twisted or braided together, and preferably coated with a lubricant so that the individual fibers will slide upon one another. The lubricating coating must be of insulating material such as viscous liquid silicon compounds, phthalate esters, chlorinated aromatic hydrocarbons, tricresyl phosphate and the like. It is to be of sufficient thickness or diameter to be able to adequately carry the cable load imposed upon it. The length of rope 3 is dependent upon the voltage carried by the line, the higher the voltage, the longer the length. Disc type insulators 9 may be mounted along the length of rope 3 to lengthen the leakage path and minimize arcing across the rope suspension means.

Rope 3 is preferably mounted by looping the upper portion 4 around the inside of eyebolt 2, the loop being preferably supported by a rigid curved support 12 in which loop 4 is disposed.

Support 12 may be of hard phenolformaldehyde plastic, laminated glass fiber resin, or the like. Insulators 9 may be made of similar material, these being cemented or otherwise fixed to rope 3 at openings 10. The purpose of support 12 is to prevent undue concentrated stress at any point along loop 4 and thus gradually break the brittle fibers of which rope 3 is made. End 5 of loop 4 may be clamped to rope 3 by clamps 7 and 8 or otherwise suitably fixed by cementing as in Figure 3, or otherwise.

The bottom portion of rope 3 holding high tension cable 11 may be similarly constructed for carrying the cable, around which is looped end 13 of rope 3, disposed in curved support 14 which is similar to 12, the free end of rope 3 being clamped to rope 3 by clamp 15.

An alternative means for mounting the cable is disclosed in Figure 3. Here housing 16, preferably of hard and tough plastic (such as laminated phenolformaldehyde resin) carries centrally disposed recess 17, the lower part 6 of which is wider than the upper portion. Space 18 is filled with thermoplastic material such as polystyrene, cellulose ester, methacrylate polymers, or the like. In practice, the end of rope 3 is inserted in opening 17 and the molten thermoplastic material is poured in and the components held in place until material 18 is solidified, thus anchoring firmly the end of rope 3 to housing 16. The lower part of housing 16 is widened to form flange 19 and provided with centrally disposed recess 24 in which cable 11 is disposed. Plate 23, also carrying a suitable recess 24, is disposed below cable 11 and provided with means for bolting a flange 19 by bolts 21 and nuts 22. By this means it is possible to carry the load of the cable without imposing any flexing stress upon rope 3 other than the inherent inner stresses in the rope.

One advantage of the present unit, is its lightness when compared to units now in use. Also, since insulating disks 9 carry no load and are not under stress, they may be made of very light weight material, yet they still are fully efficient in lengthening the leakage path. Another advantage of the present unit is the fact that it eliminates the use of metal, a material often used in joining conventional ceramic which induces a condenser effect, and thus decreases the transmission efficiency of the line. The unit of the present invention is thus able to carry higher voltages and enables wider spacing of generator stations.

Lower suspension 13, 14, etc. for cable 11 has limited uses since it does not clamp the cable to prevent lateral movement in the direction of the axis of cable 11. It can be used for short lengths of cable or intermediately disposed between clamped suspensions of the type showed in Fig. 3. Although use of a plastic has been disclosed and is preferred for housing 16 and plate 23, it is also possible to make these parts of other materials such as aluminum, and the like.

I claim:

A flexible suspension for high tension cables comprising a rope of thin glass fibers, a layer of insulating liquid lubricant surrounding said fibers, means for anchoring the upper end of said rope, means for holding said cable on the lower end of said rope, and at least one insulating disk concentrically mounted around and cemented directly to said rope between the anchoring means and the holding means.

References Cited in the file of this patent

UNITED STATES PATENTS

| Number | Name | Date |
|---|---|---|
| 1,006,040 | Alsberg | Oct. 17, 1911 |
| 1,006,042 | Alsberg | Oct. 17, 1911 |
| 1,038,473 | Alsberg | Sept. 10, 1912 |
| 1,167,125 | Sloper | Jan. 4, 1916 |
| 2,293,918 | Planiol | Aug. 25, 1942 |

FOREIGN PATENTS

| Number | Country | Date |
|---|---|---|
| 29,839 | Great Britain | June 18, 1914 |

OTHER REFERENCES

Plastics, January 1945 edition, pgs. 40, 42, 44 and 112–115. (Copy available in 174–110.7.)

Wire and Wire Products, page 888, November 1946. (Copy available in Div. 65 of U. S. Patent Office, 174–124(1).)